Patented June 13, 1939

2,162,385

UNITED STATES PATENT OFFICE 2,162,385

PROCESS OF MANUFACTURING LARGE SURFACE ELECTRODES

Erich Langguth, Hagen-Emst, Germany

No Drawing. Application January 22, 1936, Serial No. 60,267. In Germany January 24, 1935

1 Claim. (Cl. 204—1)

My invention relates to improvements in the process of manufacturing large surface electrodes for alkaline storage batteries, and the object of the improvements is to provide a process by means of which a large amount of electro-active insoluble nickel oxide compounds may be deposited by anodic oxidation on the nickel electrode, which compound does not choke the pores of the nickel electrode, and sufficiently adheres to the electrodes.

As far as I am aware, it has heretofore not been possible to produce such nickel oxide compounds on the electrode, because in an alkaline electrolyte the passivity is too high, and in an acid electrolyte the oxide is dissolved. By adding certain salts to an alkaline electrolyte which form soluble salts with the nickel, nickel oxide may be obtained in alkaline solutions. However, the oxides which are thus formed are dissolved during electrolysis.

In my improved process the nickel oxide compounds are produced on a metallic electrode of nickel in an electrolyte which consists of concentrated primary alkali salts of multivalent acids which are adapted to form insoluble nickel salts, such for example as sodium or potassium bicarbonate.

On the nickel anode by an electrolyte containing bicarbonate metallic nickel is primarily precipitated by discharge of two $CO_3$ ions to nickel peroxide, and two molecules $CO_2$ are formed:

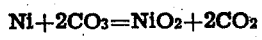

The unstable nickel peroxide is now in part transformed into the stable nickel oxide ($Ni_2O_3$), while oxygen is set free.

By the separation of $CO_2$ the electrolyte is weakened, and in order to continue the formation the said $CO_2$ may be again added to the electrolyte. For this purpose the electrolyte may be put under carbonic acid pressure, whereby the bicarbonate is readily regenerated from the monocarbonate produced by the development of the carbonic acid. Thus the optimum concentration of hydrogen ions is maintained.

In the electrolyte such primary salts must be present, because only these primary salts give the desired optimum of concentration of the hydrogen ions.

The counterelectrode used in the formation of my improved electrode may consist of iron or nickel.

In carrying out the process a nickel plate is placed in a concentrated solution of bicarbonate of sodium or potassium and connected as the anode in an electric circuit including a suitable source of electric energy. After the circuit has been closed a black precipitate of trivalent nickel oxide hydrate is produced on the electrode. Preferably, a plurality of such nickel plates are placed in close relation to one another in the said electrolyte. In this case the nickel oxide compound may be produced with such strength that a large surface electrode containing a large amount of active oxygen compound is produced. It is preferred to use porous nickel electrodes, in which case the active mass is also produced in the pores.

I have found that components of nickel oxide hydrate which have been thus produced by anodic precipitation are particularly electro-active. 1 gram of this mass when discharged in a storage battery develops as much as 0.24 ampere-hours, which is a close approximation to the theoretic effect.

In a modification of the process the electrolyte consists of a solution of borax to which boric acid is added. By the addition of boric acid to the solution of borax the acid salt of boric acid is produced. When boric acid is added to a solution of sodium tetraborate (borax) the following reaction occurs:

Such being the electrolyte, in the ensuing electrolysis nickel hydroxide is formed, according to the following double reaction, and being formed is deposited on the anode.

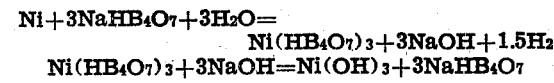

I claim:

The herein described process of manufacturing large surface electrodes, which consists in placing a nickel electrode as anode in an electrolyte consisting of a solution of borax and having boric acid dissolved therein, connecting the said electrode and electrolyte in an electric circuit containing a source of electric energy, and closing the said circuit.

ERICH LANGGUTH.